April 23, 1940.  J. W. LEIGHTON  2,198,544
INDIVIDUAL WHEEL SUSPENSION
Filed March 13, 1936  2 Sheets-Sheet 1
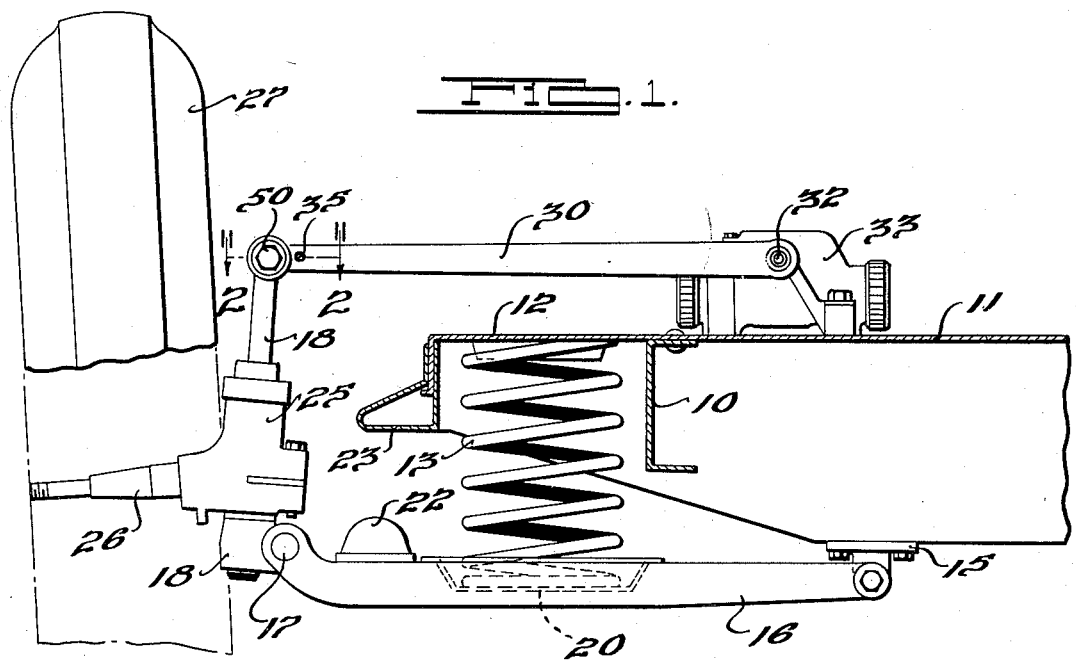
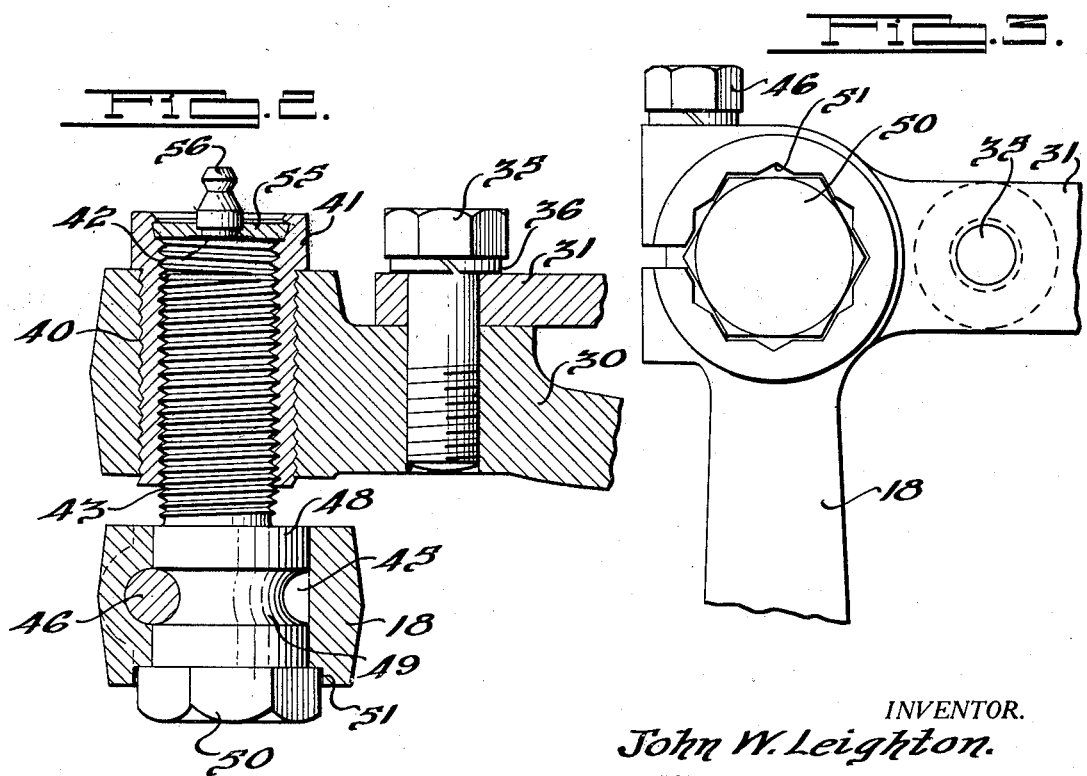
INVENTOR.
John W. Leighton.
BY
Harness, Dickey, Pierce & Hann.
ATTORNEYS.

April 23, 1940. J. W. LEIGHTON 2,198,544
INDIVIDUAL WHEEL SUSPENSION
Filed March 13, 1936 2 Sheets-Sheet 2

INVENTOR.
John W. Leighton.
BY
Harness, Dickey, Pierce & Hann.
ATTORNEYS.

Patented Apr. 23, 1940

2,198,544

UNITED STATES PATENT OFFICE 2,198,544

INDIVIDUAL WHEEL SUSPENSION

John W. Leighton, Port Huron, Mich.

Application March 13, 1936, Serial No. 68,595

1 Claim. (Cl. 287—92)

The present invention relates to independent wheel suspensions for automotive vehicles. More particularly it relates to an independent wheel suspension in which particularly effective means are provided for adjusting the camber of the wheels.

The present application is an improvement over applicant's prior co-pending application, Serial No. 733,487, filed July 2, 1934, now Patent No. 2,105,541, issued January 18, 1938.

In the particular generic type of independent wheel suspensions with which the present application is primarily concerned, the king pin on which the stub axle of the wheel is rotatably mounted for steering movement, is supported by a pair of laterally extending wishbones which are pivotally connected to the frame of the vehicle. The camber of the wheels is adjusted by varying the effective length of one or the other of these wishbones, consequently varying the inclination of the axis of the king pin about which the front wheel is journaled.

The present invention has for a general object the provision of relatively simple and effective means for varying the effective length of one of the wishbones which serve to interconnect this king pin with the frame of the vehicle.

Still further, the present invention contemplates the provision of a construction including means for varying the effective length of one of the wishbones, which means may be effectively and permanently locked in position after the desired adjustment has been made.

Further objects of the invention include a novel and simple method of interconnecting the outer ends of one of the wishbones with the king pin; novel means for locking the outer ends of one of the wishbones together and means associated with this locking means for providing an exceptionally simple pivotal connection between the wishbone and the king pin with which it is connected.

Many other and further objects and advantages of the present invention will become apparent from the following specification when considered in connection with the accompanying drawings forming a part thereof.

In the drawings:

Fig. 1 is a fragmentary vertical sectional view through the front portion of an automobile embodying the improved independent front wheel suspension of the present invention.

Fig. 2 is an enlarged transverse sectional view taken substantially on the line 2—2 of Fig. 1 illustrating in detail the novel adjustable connection between the outer end of the wishbone and the upper end of the king pin.

Fig. 3 is an enlarged fragmentary elevational view of the adjusting means for varying the effective length of the wishbone and the means for locking the adjusting means in position after adjustment has been made.

Figure 4:
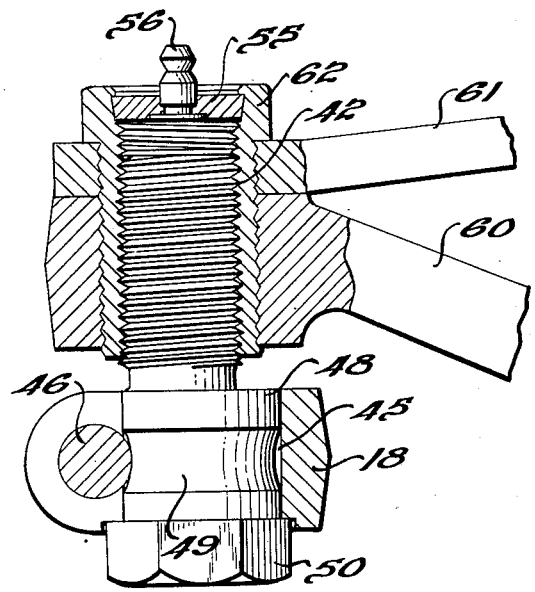
Fig. 4 is a sectional view similar to Fig. 2 illustrating a modified means for interconnecting the outer ends of the wishbone construction.

With more particular reference to the drawings, the specific embodiment of the invention disclosed therein illustrates a wheel suspension particularly adaptable for mounting the steered wheels of automotive vehicles.

With particular reference to the form of the invention illustrated in Figs. 1, 2 and 3, the construction shown comprises a vehicle frame, including a longitudinally extending inwardly presenting channel member 10, which, as is conventional in the art, is connected to a corresponding frame member at the opposite side of the vehicle by means of a transversely extending frame member 11. This transversely extending frame member 11 preferably extends outwardly past the longitudinal frame member 10 to provide a downwardly presenting recess 12 adapted to receive the upper end of a compression coil spring 13, the purpose and function of which will hereinafter become clear.

Suitable brackets 15 are secured to the lower side of the transversely extending frame member 11 and serve to provide a pivotal mounting for an outwardly extending lower wishbone 16 which is connected at its outer end by means of a suitable pivotal connection 17 to a king pin or wheel supporting member 18. A suitable pan 20 is mounted between these members constituting the wishbone 16 and is adapted to receive the lower end of the compression coil spring 13 in order to provide a resilient mounting for the king pin with respect to the frame of the vehicle.

As is conventional in constructions of this kind, a resilient bumper block 22 is mounted adjacent the outer end of the wishbone and is adapted to contact an outwardly extending abutment 23 formed on the transversely extending member 11 directly above the block 22. This block 22 may be made of rubber or similar resilient material and serves to provide a resilient limit to upward movement of the lower wishbone.

As is conventional in structures of this kind, a housing 25 is journaled by means of suitable threaded bearings upon the king pin 18 and has formed preferably integral therewith a stub axle 26 on which is journaled a conventional wheel 27.

An upper wishbone, comprising a pair of arms 30 and 31, serves to connect the frame of the vehicle with the end of the king pin 18. The inboard end of this upper wishbone is preferably pivotally connected to the frame at relatively widely spaced points and, as is illustrated in Fig. 1, the inner end of the arms 30 and 31 are threadably journaled upon a longitudinally extending stud 32 which passes through a suitable shock absorber element 33 permanently mounted upon the transverse frame member 11.

In the form of the invention illustrated in Figs. 1, 2 and 3, the outer ends of the arms 30 and 31 are rigidly connected together by means of a cap screw 35 extending through a suitable aperture in the arm 31 and threaded into a recess in the arm 30. The cap screw 35 is preferably maintained in locked position by means of a lock washer 36.

The outer end of the arm 30 is provided with a transversely extending bore 40 which is internally threaded with locking thread to receive a complementary threaded bushing 41. The bushing 41 is provided on its external surface with a series of locking threads which mate with the threads 40 and serve effectively to prevent relative rotational movement between the bushing 41 and the arm 30, when the bushing has been screwed into place. The bushing 41 is internally threaded with threads 42 adapted to receive an externally threaded pivot pin 43 which, as will hereinafter be more clearly seen, provides the pivotal connection between the wishbone and the upper end of the king pin 18. The upper end of the king pin 18 is provided with a cylindrical transversely extending bore 45 and is slotted to permit a slight expansion and contraction of the diameter of the bore by means of a tangentially mounted locking screw 46 which is preferably arranged substantially perpendicular to the slot which it serves to control and threaded into the portion of the king pin on one side of the slot. This locking screw 46 intersects the bore 45 and serves a very important additional function, as will hereinafter be more clearly seen.

The pivot pin 43 is provided with a substantially cylindrical body portion 48 eccentrically disposed upon an axis parallel to the axis of the threaded portion of the pin and of a diameter adapted to be received within the bore 45. This cylindrical portion 48 is provided with a rounded annular recess 49 therearound which serves to cooperate with the bolt 46 to retain the cylindrical portion in predetermined axial position with respect to the bore. The pin 43 is provided with a polygonal head portion 50 slightly larger than the cylindrical portion 48 and as shown in the drawings may be of substantially hexagonal configuration as is conventional in structures of this kind. The king pin is recessed at the axial end of the bore 45 to provide a recess 51 of polygonal configuration which, as is seen in Fig. 3, is a twelve-sided figure adapted to receive the hexagonal head 50 and maintain the pin 43 in any one of twelve different positions of angular movement.

From the structure described above, it will be clear that when it is desired to adjust the camber of the wheels which, as stated above, may be varied by altering the effective length of the wishbone 30, it will be appreciated that the effective length of the wishbone 30 extends from the pivotal axis of the bearing 32 to the pivotal axis of the threaded bearing 43 within the bushing 41. Due to the eccentrically mounted cylindrical portion 48 of the pivot pin 43, it will be appreciated that the axis of the pivot pin 43 may be shifted substantially by rotation of the pivot pin. In order to effect this adjustment, the bolt 46 is removed, consequently permitting axial movement of the king pin 18 with respect to the cylindrical eccentric 48. The king pin is moved axially sufficiently to permit the hexagonal head 50 of the pivot pin to move out of the complemental recess 51. The pin may then be rotated to adjust the camber of the wheel the desired degree and after such adjustment is made, the head portion of the king pin 18 is slid axially back to the recess 51, thus engaging the hexagonal head 50 of the pivot pin and positively preventing rotation thereof. The bolt 46 is then screwed in place, thus firmly locking the head portion 50 of the pivot pin within the complemental recess 51 in the head of the king pin.

The threaded bearing 42 is preferably closed at its opposite axial end by means of a closure disc 55, which may be provided with a suitable lubricant fitting 56 by means of which the threaded bearing may be supplied with lubricant from time to time as may be necessary.

In the form of the invention illustrated in Fig. 4, a modified form of wishbone construction is shown. In this form of the invention, the two arms of the wishbone 60 and 61 are of substantially equal length and are provided at their outer ends with co-axial apertures. These co-axial apertures are each internally threaded with locking threads and are adapted to receive a bushing 62 provided on its external surface with complemental locking threads. It will be appreciated that in this form of the invention the bushing 62 serves not only the purpose of providing a threaded bearing for the pivot pin but serves the purpose of providing means for interlocking the outer ends of the wishbone construction and maintaining them in predetermined relative position. In this form of the invention, it will be appreciated that the cap screw 35 described in connection with the preferred embodiment of the invention for securing the outer ends of the wishbone members together is eliminated.

Figure 5:
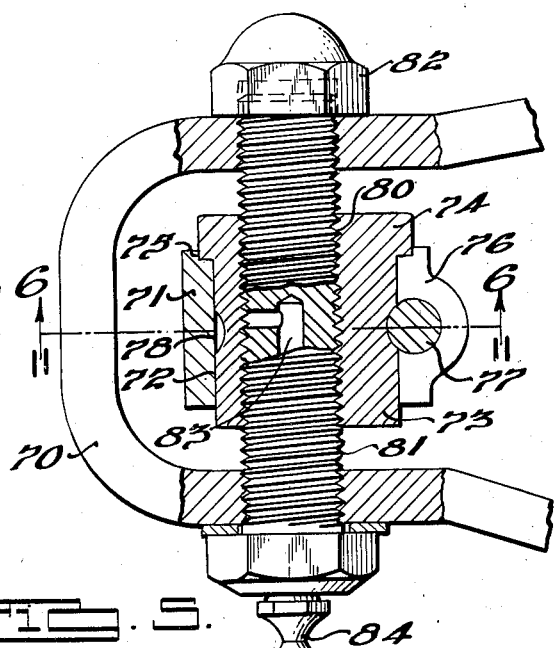
Fig. 5 is a transverse sectional view similar to Figs. 2 and 4, illustrating a still further modified means of interconnecting one of the wishbones with the king pin, to adjust the effective length of the wishbone.
Figure 6:
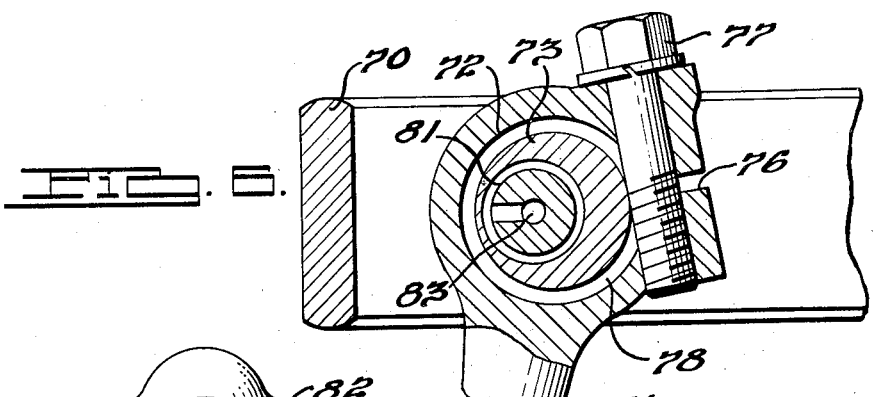
Fig. 6 is a sectional view taken substantially on the line 6—6 of Fig. 5, illustrating in detail the construction of the adjustment mechanism shown therein.

In the modified form of the invention illustrated in Figs. 5 and 6, a construction is shown in which adjustment is provided for an assembly when it is desired to utilize an integrally formed wishbone member of substantially U-shape. In this form of the invention, the outer end of a wishbone 70 of integral construction is shown. A king pin 71 has a transverse axial bore 72 through the upper end thereof of sufficiently large diameter to receive an eccentric bushing 73, which bushing has a polygonal head portion 74 adapted to be received in a complemental recess 75 at the axial end of the bore 72 through the upper end of the king pin 71. A longitudinal slot 76 extends throughout the length of the bore 72 and it will be appreciated that the bore may be enlarged, or decreased in size slightly by means of a tangentially extending locking screw 77, which intersects the bore 72. The bushing 73 is provided with a rounded circumferentially extending groove 78 which cooperates with the locking screw 77 to retain the eccentric bushing in predetermined longitudinal position with respect to the head of the king pin and serves to retain the head 74 of the bushing seated in the complemental polygonal recess 75.

The bushing is provided with an axially extending eccentrically disposed internally threaded bore 80 which serves to cooperate with an externally threaded pivot pin 81 to provide a threaded bearing between the wishbone 70 and the king pin 71. The pivot pin 81 is threaded into the two arms of the wishbone 70 and is preferably locked against rotation therein by means of a cap nut 82 threaded on one end thereof. As is conventional in structures of this kind, the pivot pin 81 may be provided with an axially extending bore 83 which communicates with a suitable lubricant fitting 84 in the axial end of the pin and serves to provide means for supplying the threaded bearing with suitable lubricant.

It will be clear that the pivotal connection described in connection with Figs. 5 and 6 may be adjusted the same way as the modified forms of the invention described above. The locking screw 77 may be removed, thus permitting the head of the king pin 71 to be moved axially along the bushing 74 a sufficient distance to withdraw the polygonal head 74 of the bushing from its complemental engagement with the recess 75. The bushing may then be rotated and, due to its eccentric mounting, it will vary the effective length of the wishbone 70 until the desired camber adjustment is obtained. After the desired adjustment has been obtained, the bushing may be locked against rotation with respect to the head of the king pin by reinsertion of the locking screw 77.

Figure 7:
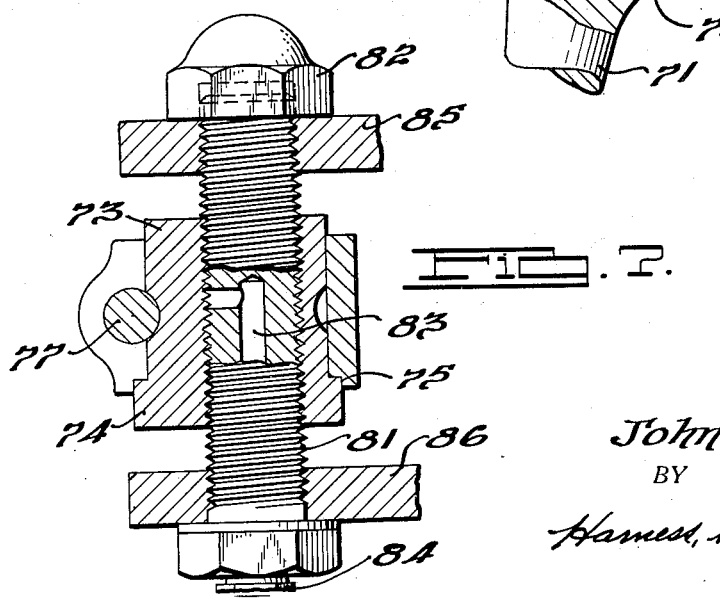
Fig. 7 is a transverse sectional view similar to Fig. 5 showing the adjustment mechanism thereof utilized in connection with a still further modified form of wishbone construction.

In the modified form of the invention disclosed in Fig. 7, substantially the same type of construction is shown as has been described above in connection with Figs. 5 and 6, except that a slightly modified form of wishbone construction is used. In this form of the invention, the wishbone comprises a pair of members 85 and 86 which are provided with internally threaded bores at their outer ends adapted to receive the pivot pin 81. It will be appreciated that, due to the threaded engagement of the outer ends of these wishbone arms 85 and 86 with the pivot pin 81, the arms of the wishbone are maintained in predetermined spaced relation with respect to the head of the king pin, and it will be seen that in other respects this modified form of the invention is substantially the same as that shown in Figs. 5 and 6 and described in detail.

It will be appreciated that, while the form of the invention illustrated herein has been specifically described, the above embodiments of the invention are merely illustrative of the generic inventive concept presented. Many other and further modifications falling within the scope of the subjoined claim will be apparent to those skilled in the art.

What is claimed is:

An adjustable pivotal connection for joining a pair of members comprising a bushing having a threaded bore providing a pivotal threaded bearing with one of said members, said bushing having an external surface eccentric with respect to said bore, said bushing extending through the other of said members, an interfitting portion on said bushing and said last mentioned member for locking the same against relative rotation.

JOHN W. LEIGHTON.